US00RE41120E

(19) United States
(12) Reissued Patent
Bakshi

(10) Patent Number: US RE41,120 E
(45) Date of Reissued Patent: Feb. 16, 2010

(54) PROCESS FOR ULTRA LOW SULFUR GASOLINE

(75) Inventor: Amarjit S. Bakshi, Katy, TX (US)

(73) Assignee: Catalytic Distillation Technologies, Pasadena, TX (US)

(21) Appl. No.: 11/970,945

(22) Filed: Jan. 8, 2008

Related U.S. Patent Documents

Reissue of:
(64) Patent No.: 7,261,809
Issued: Aug. 28, 2007
Appl. No.: 10/295,706
Filed: Nov. 15, 2002

U.S. Applications:
(60) Provisional application No. 60/344,290, filed on Dec. 28, 2001.

(51) Int. Cl.
*C10G 45/04* (2006.01)

(52) U.S. Cl. ..... 208/210; 208/209; 208/213; 208/89; 208/97

(58) Field of Classification Search ..... 208/210, 208/209, 213, 89, 97
See application file for complete search history.

(56) References Cited

U.S. PATENT DOCUMENTS

| | | | | | |
|---|---|---|---|---|---|
| 4,213,847 | A | * | 7/1980 | Chen et al. | 208/111.15 |
| 5,837,130 | A | * | 11/1998 | Crossland | 208/213 |
| 6,083,378 | A | * | 7/2000 | Gildert et al. | 208/209 |
| 6,303,020 | B1 | * | 10/2001 | Podrebarac et al. | 208/210 |
| 6,338,793 | B1 | * | 1/2002 | Putman | 208/213 |
| 6,416,659 | B1 | * | 7/2002 | Groten et al. | 208/213 |
| 6,440,299 | B2 | * | 8/2002 | Hearn et al. | 208/189 |
| 6,444,118 | B1 | * | 9/2002 | Podrebarac et al. | 208/210 |
| 6,495,030 | B1 | * | 12/2002 | Podrebarac | 208/218 |
| 6,514,403 | B1 | * | 2/2003 | Louie et al. | 208/58 |

* cited by examiner

*Primary Examiner*—Tam M Nguyen
(74) *Attorney, Agent, or Firm*—Osha • Liang LLP

(57) ABSTRACT

A process for removing organic sulfur compounds from heavy boiling range naphtha in a dual purpose reactor wherein the heavy boiling range naphtha is fed downflow over a fixed bed of hydrodesulfurization zone and then treated with hydrogen in a hydrodesulfurization catalytic distillation zone. Vapor containing hydrogen sulfide is removed between the zones. Preferably the heavy boiling range naphtha is produced by treating a full boiling range naphtha to concurrently react diolefins and mercaptans and split the light and heavy boiling range naphtha in a distillation column reactor.

2 Claims, 1 Drawing Sheet

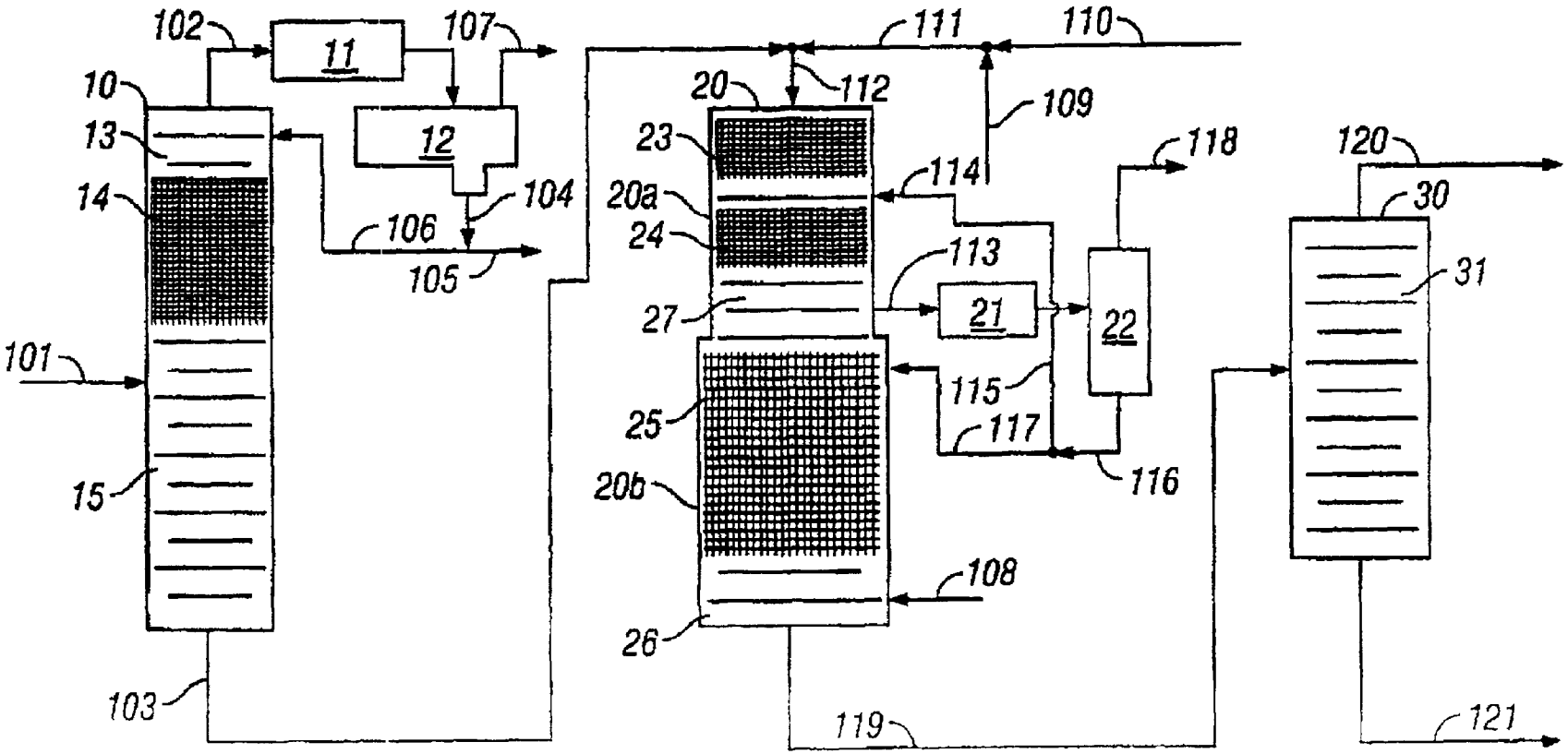
10
11
12
13
14
15
20
20a
20b
21
22
23
24
25
26
27
30
31
101
102
103
104
105
106
107
108
109
110
111
112
113
114
115
116
117
118
119
120
121

PROCESS FOR ULTRA LOW SULFUR GASOLINE

Matter enclosed in heavy brackets [ ] appears in the original patent but forms no part of this reissue specification; matter printed in italics indicates the additions made by reissue.

*CROSS REFERENCE TO RELATED APPLICATIONS*

*This application claims benefit to U.S. Provisional Application Ser. No. 60/344,290, filed Dec. 28, 2001.*

BACKGROUND OF THE INVENTION

1. Field of the Invention

The present invention relates to a process for removing organic sulfur compounds from a full range naphtha stream.

2. Related Information

Petroleum distillate streams contain a variety of organic chemical components. Generally the streams are defined by their boiling ranges which determine the compositions. The processing of the streams also affects the composition. For instance, products from either catalytic cracking or thermal cracking processes contain high concentrations of olefinic materials as well as saturated (alkanes) materials and polyunsaturated materials (diolefins). Additionally, these components may be any of the various isomers of the compounds.

The composition of untreated naphtha as it comes from the crude still, or straight run naphtha, is primarily influenced by the crude source. Naphthas from paraffinic crude sources have more saturated straight chain or cyclic compounds. As a general rule most of the "sweet" (low sulfur) crudes and naphthas are paraffinic. The naphthenic crudes contain more unsaturates and cyclic and polycyclic compounds. The higher sulfur content crudes tend to be naphthenic. Treatment of the different straight run naphthas may be slightly different depending upon their composition due to crude source.

Reformed naphtha or reformate generally requires no further treatment except perhaps distillation or solvent extraction for valuable aromatic product removed. Reformed naphthas have essentially no sulfur contaminants due to the severity of their pretreatment for the process and the process itself.

Cracked naphtha as it comes from the catalytic cracker has a relatively high octane number as a result of the olefinic and aromatic compounds contained therein. In some cases this fraction may contribute as much as half of the gasoline in the refinery pool together with a significant portion of the octane.

Catalytically cracked naphtha gasoline boiling range material currently forms a significant part (≈⅓) of the gasoline product pool in the United States and it provides the largest portion of the sulfur. The sulfur impurities may require removal, usually by hydrotreating, in order to comply with product specifications or to ensure compliance with environmental regulations.

The most common method of removal of the sulfur compounds is by hydrodesulfurization (HDS) in which the petroleum distillate is passed over a solid particulate catalyst comprising a hydrogenation metal supported on an alumina base. Additionally copious quantities of hydrogen are included in the feed. The following equations illustrate the reactions in a typical HDS unit:

$$RSH+H_2 \rightarrow RH+H_2S \quad (1)$$

$$RCl+H_2 \rightarrow RH+HCl \quad (2)$$

$$2RN+4H_2 \rightarrow 2RH+2NH_3 \quad (3)$$

$$ROOH+2H_2 \rightarrow RH+2H_2O \quad (4)$$

Typical operating conditions for the HDS reactions are:

| | |
|---|---|
| Temperature, ° F. | 600-780 |
| Pressure, psig | 600-3000 |
| $H_2$ recycle rate, SCF/bbl | 1500-3000 |
| Fresh $H_2$ makeup, SCF/bbl | 700-1000 |

After the hydrotreating is complete, the product may be fractionated or simply flashed to release the hydrogen sulfide and collect the now desulfurized naphtha.

In addition to supplying high octane blending components the cracked naphthas are often used as sources of olefins in other processes such as etherifications. The conditions of hydrotreating of the naphtha fraction to remove sulfur will also saturate some of the olefinic compounds in the fraction reducing the octane and causing a loss of source olefins.

Various proposals have been made for removing sulfur while retaining the more desirable olefins. Since the olefins in the cracked naphtha are mainly in the low boiling fraction of these naphthas and the sulfur containing impurities tend to be concentrated in the high boiling fraction the most common solution has been prefractionation prior to hydrotreating. The prefractionation produces a light boiling range naphtha which boils in the range of $C_5$ to about 250° F. and a heavy boiling range naphtha which boils in the range of from about 250-475° F.

The predominant light or lower boiling sulfur compounds are mercaptans while the heavier or higher boiling compounds are thiophenes and other heterocyclic compounds. The separation by fractionation alone will not remove the mercaptans. However, in the past the mercaptans have been removed by oxidative processes involving caustic washing. A combination oxidative removal of the mercaptans followed by fractionation and hydrotreating of the heavier fraction is disclosed in U.S. Pat. No. 5,320,742. In the oxidative removal of the mercaptans the mercaptans are converted to the corresponding disulfides.

SUMMARY OF THE INVENTION

Briefly the present invention is a process for removing organic sulfur from heavy naphtha bottoms by feeding the heavy bottoms to a dual purpose reactor vessel having two sections, the top section having a smaller diameter than the lower section such that the liquid hourly space velocity (volume of liquid per hour per volume of catalyst) is higher in the upper section than in the lower section. A standard hydrodesulfurization catalyst is disposed in the upper section and the naphtha is fed downflow concurrently with hydrogen where a portion of the organic sulfur compounds (including the sulfides from the naphtha splitter) are reacted with hydrogen to form hydrogen sulfide. Substantially all of the vapor is removed below the catalyst bed and the condensible material is condensed in a condenser and returned to a point above the lower section, preferably below the vapor removal. The uncondensed vapor, containing unreacted hydrogen, hydrogen sulfide and lights is further treated to remove the lights and hydrogen sulfide (as in an amine treater) and the hydrogen recycled to the top of the reactor. Liquid flows from the upper section into the lower section. Preferably the LHSV (liquid hourly space velocity) in the lower section is lower than that in the upper section.

The lower section contains a bed of hydrodesulfurization catalyst in the form of a catalytic distillation structure. The flow is countercurrent with hydrogen being fed below the bed. The remaining organic sulfur compounds are reacted with hydrogen concurrently with distillation, the vapor being removed along with the vapor from the upper section, between the two sections. The treated heavy naphtha is removed as bottoms below the lower bed. Because the hydrogen sulfide is removed between the sections there is less opportunity for recombinant mercaptans to be produced and the ultra low sulfur content can be achieved.

In a preferred embodiment a full boiling range naphtha is first split into a light cracked naphtha and a heavy cracked naphtha in a splitter which also contains a nickel catalyst which reacts the diolefins contained in the naphtha with the mercaptans in the naphtha to form heavier boiling sulfides which are removed along with the heavy naphtha bottoms which are the feed to the dual purpose reactor. The light naphtha which is reduced in sulfur and diene content is removed as overheads from the splitter. The organic sulfur compounds in the gasoline can be reduced to ultra low levels, i.e., less than 10 wppm from a full boiling range fluid catalytically cracked naphtha.

As used herein the term "distillation column reactor" means a distillation column which also contains catalyst such that reaction and distillation are going on concurrently in the column. In a preferred embodiment the catalyst is prepared as a distillation structure and serves as both the catalyst and distillation structure.

BRIEF DESCRIPTION OF THE DRAWING

The FIGURE is a simplified flow diagram in schematic form of the preferred embodiment of the invention.

DETAILED DESCRIPTION OF THE PREFERRED EMBODIMENT

The feed to the process comprises a sulfur-containing petroleum fraction which boils in the gasoline boiling range. Feeds of this type include light naphthas having a boiling range of about $C_5$ to 330° F. and full range naphthas having a boiling range of $C_5$ to 420° F. Generally the process is useful on the naphtha boiling range material from catalytic cracker products because they contain the desired olefins and unwanted sulfur compounds. Straight run naphthas have very little olefinic material, and unless the crude source is "sour", very little sulfur.

The sulfur content of the catalytically cracked fractions will depend upon the sulfur content of the feed to the cracker as well as the boiling range of the selected fraction used as feed to the process. Lighter fractions will have lower sulfur contents than higher boiling fractions. The front end of the naphtha contains most of the high octane olefins but relatively little of the sulfur. The sulfur components in the front end are mainly mercaptans and typical of those compounds are: methyl mercaptan (b.p. 43° F.), ethyl mercaptan (b.p. 99° F.), n-propyl mercaptan (b.p. 154° F.), iso-propyl mercaptan (b.p. 135-140° F.), iso-butyl mercaptan (b.p. 190° F.), tert-butyl mercaptan (b.p. 147° F.), n-butyl mercaptan (b.p. 208° F.), sec-butyl mercaptan (b.p. 203° F.), isoamyl mercaptan (b.p. 250° F.), n-amyl mercaptan (b.p. 259° F.), α-methylbutyl mercaptan (b.p. 234° F.), α-ethylpropyl mercaptan (b.p. 293° F.), n-hexyl mercaptan (b.p. 304° F.), 2-mercapto hexane (b.p. 284° F.), and 3-mercapto hexane (b.p. 135° F.). Typical sulfur compounds found in the heavier boiling fraction include the heavier mercaptans, thiophenes sulfides and disulfides.

The reaction of mercaptans and diolefins to produce sulfides called thioetherification. Catalysts which are useful for this reaction include the Group VIII metals, such as palladium and nickel. Generally the metals are deposited as oxides on an alumina support. The supports are usually small diameter extrudates or spheres. A suitable catalyst for the reaction is 58 wt. % Ni onto 14 mesh alumina spheres, supplied by Calcicat, designated as E-475-SR. Typical physical and chemical properties of the catalyst as provided by the manufacturer are as follows:

TABLE I

| | |
|---|---|
| Designation | E-475-SR |
| Form | Spheres |
| Nominal size | 8 × 14 Mesh |
| Ni wt. % | 54 |
| Support | Alumina |

For use in a catalytic distillation system the catalyst is prepared as distillation structures as described hereinafter.

The hydrogen rate to the reactor must be sufficient to maintain the reaction, but kept below that which would cause flooding of the column, which is understood to be the "effectuating amount of hydrogen" as that term is used herein. Generally the mole ratio of hydrogen to diolefins and acetylenes in the feed is at least 1.0 to 1.0, preferably at least 2.0 to 1.0 and more preferably at least 10 to 1.0.

The catalyst also catalyzes the selective hydrogenation of the polyolefins contained within the light cracked naphtha and to a lesser degree the isomerization of some of the mono-olefins. Generally the relative absorption preference is as follows:

(1) sulfur compounds (2) diolefins (3) mono-olefins

If the catalyst sites are occupied by a more strongly absorbed species, reaction of these weaker absorbed species cannot occur.

The reaction of interest is the reaction of the mercaptans and/or hydrogen sulfide ($H_2S$) with diolefins. In the presence of the catalyst the mercaptans will also react with mono-olefins. However, there is an excess of diolefins to mercaptans and/or hydrogen sulfide ($H_2S$) in the light cracked naphtha feed and the mercaptans preferentially react with them before reacting with the mono-olefins. The equation of interest which describes the reaction is:

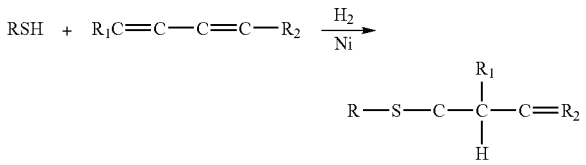

Where $R_1$ and $R_2$ are independently selected from hydrogen and hydrocarbyl groups of 1 to 20 carbon atoms. This may be compared to the HDS reaction which consumes hydrogen. If there is concurrent hydrogenation of the dienes, then hydrogen will be consumed in that reaction.

The reaction of organic sulfur compounds in a refinery stream with hydrogen over a catalyst to form $H_2S$ is typically called hydrodesulfurization. Hydrotreating is a broader term which includes saturation of olefins and aromatics and the reaction of organic nitrogen compounds to form ammonia. However, hydrodesulfurization is included and is sometime simply referred to as hydrotreating.

Catalysts which are useful for the hydrodesulfurization reaction include Group VIII metals such as cobalt, nickel, palladium, alone or in combination with other metals such as molybdenum or tungsten on a suitable support which may be alumina, silica-alumina, titania-zirconia or the like. Normally the metals are provided as the oxides of the metals supported on extrudates or spheres and as such are not generally useful as distillation structures.

The catalysts contain components from Group V, VIB, VIII metals of the Periodic Table or mixtures thereof. The use of the distillation system reduces the deactivation and provides for longer runs than the fixed bed hydrogenation units of the prior art. The Group VIII metal provides increased overall average activity. Catalysts containing a Group VIB metal such as molybdenum and a Group VIII such as cobalt or nickel are preferred. Catalysts suitable for the hydrodesulfurization reaction include cobalt-molybdenum, nickel-molybdenum and nickel-tungsten. The metals are generally present as oxides supported on a neutral base such as alumina, silica-alumina or the like. The metals are reduced to the sulfide either in use or prior to use by exposure to sulfur compound containing streams. The catalyst may also catalyze the hydrogenation of the olefins and polyolefins contained within the light cracked naphtha and to a lesser degree the isomerization of some of the mono-olefins. The hydrogenation, especially of the mono-olefins in the lighter fraction may not be desirable.

The properties of a typical hydrodesulfurization catalyst are shown in Table II below.

TABLE II

| | |
|---|---|
| Manufacture | Criterion Catalyst Co. |
| Designation | C-448 |
| Form | Tri-lobe Extrudate |
| Nominal size | 1.2 mm diameter |
| Metal, Wt. % | |
| Cobalt | 2-5% |
| Molybdenum | 5-20% |
| Support | Alumina |

The catalyst typically is in the form of extrudates having a diameter of 1/8, 1/16 or 1/32 inches and an L/D of 1.5 to 10. The catalyst also may be in the form of spheres having the same diameters. They may be directly loaded into standard single pass fixed bed reactors which include supports and reactant distribution structures. However, in their regular form they form too compact a mass and must then be prepared in the form of a catalytic distillation structure.

The catalytic distillation structure must be able to function as catalyst and as mass transfer medium. The catalyst must be suitably supported and spaced within the column to act as a catalytic distillation structure. A suitable structure for the catalyst is disclosed in U.S. Pat. No. 5,266,546, which is hereby incorporated by reference. Other catalytic distillation structures useful for this purpose are disclosed in U.S. Pat. Nos. 4,731,229, 5,073,236, 5,431,890 and 5,730,843 which are also incorporated by reference. When the hydrodesulfurization catalyst is prepared as described, it becomes a hydrodesulfurization catalytic distillation structure.

Referring now to the FIGURE a preferred embodiment of the invention is shown. Hydrogen and naphtha are fed via flow line 101 to distillation reactor 10 which contains a bed 14 of thioetherification catalyst in the form of catalytic distillation structure in the rectification section. The dienes contained within the naphtha react with the mercaptans to form higher boiling sulfides. Standard distillation trays 13 are provided above the bed 14 to ensure separation of the sulfides from the light naphtha which is taken as overheads via flow line 102. Condensible material is condensed in partial condenser 11 and passed on to receiver/separator 12 where the uncondensed vapor is separated from the condensed liquid via flow line 107. Liquid is withdrawn via flow line 104 with light naphtha product being removed via flow line 105. A portion of the condensed naphtha is returned to the distillation column reactor 10 as reflux via flow line 106.

The stripping section of the distillation column reactor 10 also contains standard distillation trays 15 where the light heavy naphtha is stripped of the light naphtha and taken as bottoms via flow line 103.

The heavy naphtha bottoms in flow line 103 containing the higher boiling organic sulfur compounds and the sulfides are combined with hydrogen from line 111 and fed via flow line 112 to dual purpose reactor 20 which contains standard beds of hydrodesulfurization catalysts 23 and 24 in the upper section and a bed 25 of hydrodesulfurization catalyst in the form of catalytic distillation structure in the lower section. Standard liquid redistribution trays are disposed between the beds 23 and 24 and standard distillation trays 26 are disposed below the bed 25. The feed of the heavy naphtha and hydrogen is concurrent and downflow over the beds 23 and 24 where a portion of the organic sulfur compounds react with hydrogen to produce hydrogen sulfide.

The vapor containing vaporized naphtha, hydrogen and hydrogen sulfide from the beds 23 and 24 is removed from section 27 via flow line 113 and the condensible naphtha condensed in partial condenser 21 and passed on to receiver/separator 22 where the uncondensed hydrogen and hydrogen sulfide is separated via flow line 118 from the condensed naphtha which is removed via flow line 116. The vapors may be subjected to hydrogen sulfide removal and the clean hydrogen recycled via flow line 110 with make hydrogen added as necessary via flow line 109. Some of the condensed naphtha may be returned to the reactor 20 between the beds 23 and 24 as quench, if required, via flow line 114 with the remainder being returned to the reactor in bed 25 via flow line 117.

The bottom portion of reactor 20 is wider than the top portion to provide a lower space velocity and better conversion of the remaining organic sulfur compounds. In the bed 25 of catalytic distillation structure the remaining organic sulfur compounds are reacted with hydrogen feed which is fed in a countercurrent fashion via flow line 108. Concurrently with the reaction the distillation is occurring in the bed 25 which provides for more intimate contact of the liquid, vapor and catalyst. The vapors produced enter into section 27 and are removed via flow line 113 along with the vapors from the beds 23 and 24 and are treated along with those vapors, the naphtha being condensed and returned and the hydrogen sulfide and unreacted hydrogen removed for treatment.

The heavy naphtha product is removed from reactor 20 as bottoms via flow line 119 to a stabilizer column 30 which contains standard distillation trays 31. In the stabilizer any $C_5$ and lighter material which may have been produced due to slight hydrocracking is separated as overheads via flow line 120 with the heavy naphtha product being taken as bottoms via flow line 121.

The reactor 120 is generally of cylindrical shape with the upper portion 20a having a smaller diameter than the lower portion 20b. Flow line 112 constitutes an inlet while flow lines 113 and 119 constitute outlets which provides a higher LHSV in the upper section compared to the lower section. All of the other flow lines may be considered conduits. The reactor system can then be seen to comprise:

(a) a cylindrical reactor vessel (20) having
  (i) an upper section (20a),
  (ii) a lower section (20b), said upper section having a smaller diameter than said lower section,
  (iii) an inlet (112) at the top of said upper section,
  (iv) a first outlet (113) directly below said upper section, and
  (v) a second outlet (119) at the bottom of said lower section;

(b) at least one bed of hydrodesulfurization catalyst (23) disposed in said upper section;

(c) a bed of hydrodesulfurization catalytic structures (25) disposed within said lower section;

(d) a condenser (21) in fluid communication with said first outlet;

(e) a separator/receiver (22) having a receiver inlet, a receiver vapor outlet (118) and a liquid outlet (116), said receiver inlet in fluid communication with said condenser; and (f) a liquid conduit connecting (117) said receiver liquid outlet to said upper section.

The invention claimed is:

1. A process for the treatment of a heavy boiling range naphtha containing sulfides and other organic sulfur compounds comprising the steps of:

(a) feeding hydrogen and the heavy boiling range naphtha to a dual reaction zone comprising a fixed bed of hydrodesulfurization catalyst in an upper reaction zone thereof and a hydrodesulfurization catalytic distillation structure in a lower reaction zone thereof and a non reaction zone between said upper reaction zone and said lower reaction zone:

(i) feeding said heavy boiling range naphtha and a portion of said hydrogen downflow over said fixed bed of hydrodesulfurization catalyst in said upper reaction zone at a first LHSV to react a portion of the sulfides and other organic sulfur compounds with hydrogen to form hydrogen sulfide;

(ii) allowing liquid heavy boiling range naphtha from the bottom of said upper reaction zone and hydrogen sulfide to flow downward into a non reaction zone and said liquid heavy boiling range naphtha to flow downward from said non reaction zone into said lower reaction zone containing said hydrodesulfurization catalytic distillation structure at a second LHSV which is lower than said first LHSV;

(iii) Feeding hydrogen below said hydrodesulfurization catalytic distillation structure;

(iv) concurrently in said lower zone;
    (A) reacting sulfides and other organic sulfur compounds with hydrogen to form hydrogen sulfide and
    (B) fractionating said heavy boiling range naphtha to remove hydrogen sulfide into said non reaction zone;

(b) withdrawing vapor from said non reaction zone, said vapor containing the hydrogen sulfide produced in both said reaction zones; and (c) withdrawing heavy naphtha product below said lower reaction zone as bottoms wherein the condensable material contained within said vapor is condensed and returned to said dual reactor.

2. The process according to claim 1 wherein there are at least two fixed beds of hydrodesulfurization catalyst in said upper zone and a portion of said condensible material is returned between said beds as quench.

* * * * *